(12) United States Patent
Botti et al.

(10) Patent No.: US 12,030,654 B2
(45) Date of Patent: Jul. 9, 2024

(54) MACHINE COMPRISING A HYBRID POWERTRAIN AND CORRESPONDING CONTROL METHOD

(71) Applicant: VOLTAERO, Médis (FR)

(72) Inventors: Jean Botti, Fort Lauderdale, FL (US); Didier Esteyne, Saujon (FR)

(73) Assignee: VOLTAERO, Médis (FR)

( * ) Notice: Subject to any disclaimer, the term of this patent is extended or adjusted under 35 U.S.C. 154(b) by 686 days.

(21) Appl. No.: 17/278,770

(22) PCT Filed: Oct. 16, 2019

(86) PCT No.: PCT/FR2019/052456
§ 371 (c)(1),
(2) Date: Mar. 23, 2021

(87) PCT Pub. No.: WO2020/079369
PCT Pub. Date: Apr. 23, 2020

(65) Prior Publication Data
US 2022/0033097 A1 Feb. 3, 2022

(30) Foreign Application Priority Data
Oct. 17, 2018 (FR) ...................................... 1801092

(51) Int. Cl.
*B64D 27/24* (2024.01)
*B64D 27/02* (2006.01)
(Continued)

(52) U.S. Cl.
CPC ............. *B64D 27/24* (2013.01); *B64D 27/10* (2013.01); *B64D 35/02* (2013.01); *B64D 35/08* (2013.01); *B64D 27/026* (2024.01)

(58) Field of Classification Search
CPC ....... B64C 27/12; B64C 39/024; B64D 27/10; B64D 27/24; B64D 35/02; B64D 35/08;
(Continued)

(56) References Cited

U.S. PATENT DOCUMENTS

2006/0065779 A1  3/2006  McCoskey et al.
2006/0137355 A1*  6/2006  Welch .................. H02K 7/1823
                                                        60/802
(Continued)

FOREIGN PATENT DOCUMENTS

CN        18082500 A     5/2018
DE    102012021340 A1    4/2014
(Continued)

OTHER PUBLICATIONS

Singapore Search Report and Written Opinion dated Sep. 28, 2022 in counterpart application No. SG 11202103308S; in English (total 11 pages).
(Continued)

*Primary Examiner* — Jason H Duger
(74) *Attorney, Agent, or Firm* — Seckel IP, PLLC

(57) ABSTRACT

An engine (100) is provided with a powertrain including a heat engine (1) and an output shaft (A1), an electric motor (2), a battery (40) for supplying the electric motor (2) and a propeller propulsion system including a propeller (3) and a propeller shaft (A3), to which the propeller (3) is coupled. The powertrain includes a system of clutches (E123, E14, E23, E324) designed for different configurations to selectively drive the propeller using the heat engine without transmission of the rotation of the electric motor to the propeller; using the electric motor without transmission of the rotation of the heat engine to the propeller; using combined transmission of the rotation of the heat engine and the rotation of the electric motor to the propeller. The electric
(Continued)

motor includes a stator and a rotor mounted for rotation about a shaft rigidly connected, or capable of being coupled, to the propeller shaft.

20 Claims, 7 Drawing Sheets

(51) Int. Cl.
*B64D 27/10* (2006.01)
*B64D 35/02* (2024.01)
*B64D 35/08* (2006.01)

(58) Field of Classification Search
CPC .. B64D 2027/026; B64U 50/00; B64U 50/34; F02C 3/107; F02C 3/113; F02C 7/36
See application file for complete search history.

(56) References Cited

U.S. PATENT DOCUMENTS

| | | |
|---|---|---|
| 2010/0137090 A1 | 6/2010 | Holmes |
| 2010/0219779 A1* | 9/2010 | Bradbrook ................ F02C 7/32 60/773 |
| 2012/0001018 A1 | 1/2012 | Gilleran et al. |
| 2012/0071295 A1 | 3/2012 | Kato |
| 2013/0227950 A1 | 9/2013 | Anderson et al. |
| 2014/0010652 A1* | 1/2014 | Suntharalingam ..... B64D 27/02 475/5 |
| 2014/0060995 A1 | 3/2014 | Anderson et al. |
| 2014/0290265 A1* | 10/2014 | Ullyott ................... F02C 3/113 60/773 |
| 2015/0028594 A1 | 1/2015 | Mariotto |
| 2016/0329777 A1 | 11/2016 | Mariotto |
| 2017/0284371 A1 | 10/2017 | Gamble |
| 2018/0163558 A1 | 6/2018 | Vondrell et al. |
| 2018/0178806 A1* | 6/2018 | Nozaki ................ B60W 50/14 |
| 2019/0323427 A1* | 10/2019 | Mackin ..................... F02C 3/04 |
| 2019/0353104 A1* | 11/2019 | Kupratis ................ H02K 7/116 |

FOREIGN PATENT DOCUMENTS

| | | |
|---|---|---|
| DE | 102014224637 A1 | 6/2016 |
| EP | 2688184 A1 | 1/2014 |
| EP | 2964524 | 1/2016 |
| EP | 3296199 A1 | 3/2018 |
| JP | 2018095236 A | 6/2018 |
| JP | 2018103648 A | 7/2018 |
| JP | 2018140767 A | 9/2018 |
| WO | 2010143740 A1 | 12/2010 |
| WO | 2014137365 A1 | 9/2014 |
| WO | 2015073084 A1 | 5/2015 |

OTHER PUBLICATIONS

Japanese Office Action dated May 17, 2023 in counterpart application No. JP 2021-517786 ; with English machine translation (total 10 pages).

International Search Report and Written Opinion dated Feb. 28, 2020 in counterpart application No. PCT/FR2019/052456; with English partial translation and partial machine translation (total 27 pages).

Japanese Office Action dated Dec. 13, 2023 in counterpart application No. JP 2021-517786; with English machine translation (total 6 pages).

* cited by examiner

MACHINE COMPRISING A HYBRID POWERTRAIN AND CORRESPONDING CONTROL METHOD

FIELD OF THE INVENTION

The present invention is generally concerned with a machine, such as an aircraft, equipped with a powertrain comprising an electric motor and a thermal engine.

PRIOR ART

Known in the prior art are machines such as aircraft that comprise a powertrain with the following configuration. The powertrain comprises a propeller, an electric motor for driving the propeller, a battery for supplying power to the electric motor, and a thermal engine associated with an alternator for charging the battery.

However, in the event of a fault in the electric control system that comprises the battery and the electric motor, the propeller can no longer be driven.

This kind of configuration of the powertrain thus causes serious safety problems, in particular on take-off.

Also known from the documents DE102012021340, EP2964524 and US2010/219779 are powertrains the configurations whereof nevertheless cause problems of overall size and/or weight.

An object of the present invention is to propose a new machine for alleviating some or all of the problems described hereinabove.

SUMMARY OF THE INVENTION

In accordance with one embodiment there is proposed a machine, such as an aircraft, equipped with a powertrain that comprises:
- a thermal powertrain comprising a thermal engine and a shaft, termed the output shaft of the thermal engine, drivable in rotation by the thermal engine;
- an electric powertrain comprising an electric motor;
- an electric power supply system comprising a battery for supplying power to the electric motor;
- a propeller propulsion system comprising a propeller and a shaft, termed the propeller shaft, to which the propeller is coupled;
- the powertrain also comprising a clutch system configured, selectively:
  - to drive the propeller by means of the thermal engine without transmission of rotation from the electric motor to the propeller;
  - to drive the propeller by means of the electric motor without transmission of rotation from the thermal engine to the propeller;
  - to drive the propeller by combined transmission of the rotation movement of the thermal engine to the propeller and of the rotation movement of the electric motor to the propeller;
- the powertrain comprising a shaft, termed the intermediate shaft, rigidly connected to or able to be coupled in rotation to the propeller shaft, and the clutch system comprising:
- a first clutch configured, in the engaged state, to transmit the rotation of the thermal engine to the intermediate shaft, and
- a second clutch configured, in the engaged state, to transmit the rotation of the intermediate shaft to the propeller shaft and/or a third clutch configured, in the engaged state, to transmit the rotation of the electric motor to the propeller shaft;
- the electric motor comprising a stator and a rotor, the rotor being mounted to rotate about the intermediate shaft inside the stator, the rotor and the intermediate shaft being coaxial.

This design of the machine with the rotor mounted coaxially with and rotating about the axis of the intermediate shaft, which forms part of the movement transmission system, enables savings in terms of compactness and weight (by limiting the number of components), which makes it possible to increase the resulting power (kW) to weight (kg) ratio. In fact, the intermediate shaft extends inside the rotor and said intermediate shaft, which forms part of the mechanical transmission line, is coaxial with the rotation axis of the rotor. In accordance with one particular aspect, said intermediate shaft is also coaxial with the propeller shaft and a clutch system for coupling/uncoupling the intermediate shaft and the propeller shaft.

In accordance with one particular aspect, each shaft that forms part of the system for transmission of movement to the propeller is coaxial with the propeller shaft.

In accordance with one particular aspect, the stator takes the form of a hollow body provided with a winding, and the rotor is provided with magnets.

In accordance with one particular aspect, the powertrain also comprises an epicyclic gear train type mechanical transmission system that comprises:
- an interior shaft, termed the sun gear, corresponding to a part of the intermediate shaft and a ring gear carried by the interior of the hollow body of the rotor;
- a planet gear disposed between the sun gear and the ring gear and a planet carrier the end of which opposite the planet gear is constrained to rotate with a part of the second clutch, the second clutch comprising another part constrained to rotate with the propeller shaft.

In accordance with one particular aspect, the clutch system comprises a fourth clutch configured, in the engaged state, to transmit the rotation of the thermal engine to the electric motor to cause it to function as a generator.

In accordance with one particular aspect, the various shafts that participate in the system for transmission of movement between, on the one hand, the thermal engine and/or the electric motor and, on the other hand, the propeller shaft, are coaxial. In other words, each shaft that forms a part of the system for transmission of movement to the propeller shaft is coaxial with the propeller shaft.

In accordance with one particular aspect, the stator takes the form of a hollow body provided with a winding and/or magnets, preferably on its internal face, and the rotor is provided with magnets and/or a winding, preferably on its external peripheral face.

In accordance with one embodiment, there is proposed a machine, such as an aircraft, equipped with a powertrain that comprises:
- a thermal powertrain comprising a thermal engine and a shaft, termed the output shaft of the thermal engine, drivable in rotation by the thermal engine;
- an electric powertrain comprising an electric motor;
- an electric power supply system comprising a battery for supplying power to the electric motor;
- a propeller propulsion system comprising a propeller and a shaft, termed the propeller shaft, to which the propeller is coupled;
- in which:
- the powertrain also comprises a clutch system configured, selectively:

to drive the propeller by means of the thermal engine without transmission of rotation from the electric motor to the propeller;

to drive the propeller by means of the electric motor without transmission of rotation from the thermal engine to the propeller;

to drive the propeller by combined transmission of the rotation movement of the thermal engine to the propeller and of the rotation movement of the electric motor to the propeller.

The propeller powertrain of the machine can thus be driven independently or simultaneously by the electric powertrain and/or by the thermal powertrain. Safety, in particular on take-off when the machine is an aircraft, is improved since, in the event of a problem in the electric powertrain, the thermal powertrain is able to take over to drive the propeller.

Moreover, the possibility of using only an electric powertrain enables an aircraft to take off and to land in urban or suburban areas with reduced noise production.

The machine may also include one or more of the following features in any technically permissible combination.

In accordance with one particular aspect, the powertrain comprising a shaft, termed the intermediate shaft, rigidly connected to or adapted to be coupled in rotation to the propeller shaft, the clutch system comprises:

a first clutch configured, in the engaged state, to transmit the rotation of the thermal engine to the intermediate shaft, and a second clutch and/or a third clutch configured, in the engaged state, to transmit the rotation of the electric motor to the propeller shaft.

In accordance with one particular aspect, the second clutch, in the engaged state, enables transmission of the rotation of the intermediate shaft to the propeller shaft.

In accordance with one particular aspect, the clutch system comprises a fourth clutch configured, in the engaged state, to transmit the rotation of the thermal engine to the electric motor to cause it to function as a generator.

In accordance with one particular aspect, the electric motor comprises:

a stator taking the form of a hollow body provided with a winding on its internal face a rotor taking the form of a body rotating about the intermediate shaft and inside the stator, the rotor being provided with magnets on its external peripheral face.

In accordance with one particular aspect, the powertrain comprises a transmission system, comprising for example a clutch, for transmitting a rotation movement between the rotor and the intermediate shaft.

In accordance with one particular aspect, the powertrain comprises a mechanical transmission system for transmitting the rotation of the intermediate shaft to the propeller shaft in the engaged state of the second clutch if present. In accordance with one particular aspect, the mechanical transmission system is a reducer system.

The mechanical transmission system is advantageously housed in the rotor.

The mechanical transmission system comprises for example an epicyclic gear train with a part coupled to the intermediate to the shaft and a part coupled to a part of the second clutch, the other part of the second clutch being coupled to the propeller shaft.

In accordance with one particular aspect, the second clutch comprises a part coupled in rotation to the intermediate shaft, for example via the mechanical transmission system, and a part coupled, preferably rigidly connected, in rotation with the propeller shaft.

In accordance with one particular aspect, the fourth clutch comprises a part that, in the engaged state of the first clutch, is constrained to rotate with the output shaft of the thermal engine and another part that is mounted on and constrained to rotate with the rotor of the electric motor.

In accordance with one particular aspect, the third clutch comprises a part constrained to rotate with the rotor of the electric motor via a mechanical transmission system and a part constrained to rotate with the propeller.

In accordance with one particular aspect, the electric power supply system also includes an electric management system that comprises:

a high-tension unit for opening or closing the power supply circuit between the battery and the electric motor;

a controller for treating the current supplied by the battery or produced by the electric motor when functioning as a generator.

In accordance with one particular embodiment, there is proposed a machine, such as an aircraft, equipped with a powertrain that comprises:

a thermal powertrain comprising a thermal engine and a shaft, termed the output shaft of the thermal engine, drivable in rotation by the thermal engine;

an electric powertrain comprising an electric motor;

an electric power supply system comprising a battery for supplying power to the electric motor;

a propeller propulsion system comprising a propeller and a shaft, termed the propeller shaft, to which the propeller is coupled;

the powertrain also comprising a clutch system configured, selectively:

to drive the propeller by means of the thermal engine without transmission of the rotation of the electric motor to the propeller;

to drive the propeller by means of the electric motor without transmission of the rotation of the thermal engine to the propeller;

to drive the propeller by combined transmission of the rotation movement of the thermal engine to the propeller and of the rotation movement of the electric motor to the propeller;

the powertrain comprising a shaft, termed the intermediate shaft, rigidly connected to or able to be coupled in rotation to the propeller shaft, and the clutch system comprising:

a first clutch configured, in the engaged state, to transmit the rotation of the thermal engine to the intermediate shaft, and a second clutch configured, in the engaged state, to transmit the rotation of the intermediate shaft to the propeller shaft, the electric motor comprising:

a stator taking the form of a hollow body preferably provided with a winding, for example on its internal face;

a rotor taking the form of the a body rotating about the intermediate shaft and inside the stator, the rotor preferably being provided with magnets, for example on its external peripheral face;

the powertrain also comprising an epicyclic gear train type mechanical transmission system that comprises:

an interior shaft, termed the sun gear, corresponding to a part of the intermediate shaft, and a ring gear carried by the interior of the hollow body of the rotor;

a planet gear disposed between the sun gear and the ring gear and a planet carrier, to which the planet gear is rigidly connected, that is coaxial with the intermediate shaft and the propeller shaft, the end of the planet carrier opposite the planet gear being constrained to rotate with a part of the second clutch, the second clutch comprising another part constrained to rotate with the propeller shaft.

In accordance with one particular aspect, the epicyclic gear train type mechanical transmission system may be considered to be contained in the electric motor in the sense that it is housed in the rotor.

In accordance with one particular aspect, the clutch system comprises a third clutch configured, in the engaged state, to transmit the rotation of the electric motor, in particular of the rotor, to the propeller shaft.

In accordance with one embodiment there is proposed a method for controlling a machine as described hereinabove, in which for electric propulsion of the machine in particular during a take-off and/or climbing phase,
the clutches are brought to the following configuration:
  the first clutch is disengaged to release the thermal engine from the propeller;
  the fourth clutch, when present, and the second clutch are preferably disengaged;
  the third clutch, when present, is engaged to transmit the movement of the electric motor to the propeller.

In accordance with one embodiment there is proposed a method for controlling a machine as described hereinabove, in which, for thermal propulsion with no use of the electric powertrain, for example when a fault occurs in the electric transmission system,
the clutches are brought to the following configuration:
  the first clutch is engaged;
  the second clutch is engaged to transmit the movement of the thermal engine to the propeller.

In accordance with one embodiment there is proposed a method for controlling a machine as described hereinabove, in which, for propulsion by combined use of the thermal engine and the electric motor,
the clutches are brought to the following configuration:
  the first clutch is engaged;
  the second clutch is engaged to transmit the movement of the thermal engine to the propeller;
  the third clutch, when present, is engaged to transmit the movement of the electric motor to the propeller;
  the fourth clutch, when present, is disengaged.

In accordance with one embodiment there is proposed a method for controlling a machine as described hereinabove in which, to charge the battery using the thermal engine whilst maintaining driving in rotation of the propeller, for example for charging with the machine in flight, the clutches are brought to the following configuration:
  the first clutch, the fourth clutch and the second clutch are engaged, so that the thermal engine drives the intermediate shaft to cause the rotor, preferably provided with magnets facing the stator, preferably provided with a winding, to turn in order to generate a current (in the winding), whilst driving the propeller shaft;
  and in that the electric management system controls the current produced by the electric motor functioning as a generator to charge the battery.

In accordance with one embodiment, there is proposed a method for controlling a machine as described hereinabove in which, for recovery of energy by wind driven or water driven effect, the clutches are brought to the following configuration:
  the first clutch and/or the second clutch is or are disengaged to uncouple the propeller from the thermal engine or to uncouple the rotor from the thermal engine;
  the second clutch is preferably disengaged;
  the third clutch is engaged to transmit the movement of the propeller to the rotor of the electric motor.

In accordance with one embodiment, there is proposed a method for controlling a machine as described hereinabove in which, to charge the battery using the thermal engine without driving the propeller, the clutches are brought to the following configuration:
  the third clutch and the second clutch are disengaged,
  the first clutch and the fourth clutch are engaged, so that the thermal engine drives the intermediate shaft to cause the rotor, preferably provided with magnets facing the stator, preferably provided with the winding, to turn in order to generate a current (in the winding),
  and in that the electric management system controls the current produced by the electric motor functioning as a generator to charge the battery.

In accordance with one embodiment, there is proposed a method for controlling a machine as described hereinabove in which, the machine comprising wheels provided with an electric powertrain connected to the power supply battery of the machine via an electric management system, the method comprises supply of power to the electric powertrain of the wheels by the electric battery.

BRIEF DESCRIPTION OF THE DRAWINGS

Other features and advantages of the invention will become clearer from the following purely illustrative and non-limiting description, which must be read with reference to the appended drawings, in which.

DETAILED DESCRIPTION

Figure 1:
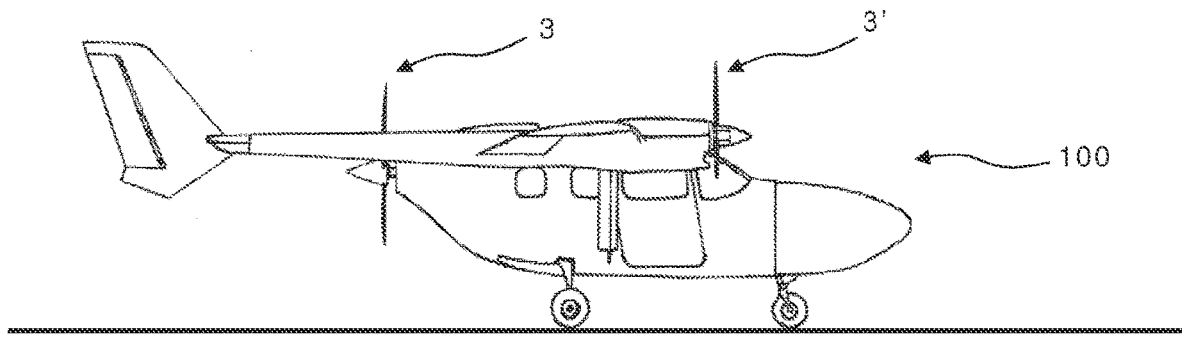
FIG. 1 is a schematic view of an aircraft conforming to one embodiment of the invention.

The concept of the invention is described more completely hereinafter with reference to the appended drawings, in which embodiments of the concept of the invention are shown. In the drawings, the size and the relative sizes of the elements may be exaggerated for clarity. Similar numbers refer to similar elements in all the drawings. However, this concept of the invention may be reduced to practise in many different forms and should not be interpreted as being limited to the embodiments described here. Instead of that, these embodiments are proposed so that this description is complete and communicates the scope of the concept of the invention to persons skilled in the art. The following embodiments are examined, for simplicity, with reference to the terminology and the structure of an aircraft. As explained hereinafter, the machine may also be a nautical craft.

A reference anywhere in the specification to "an embodiment" means that a functionality, a structure, or a particular feature described with reference to one embodiment is included in at least one embodiment of the present invention. Thus the occurrence of the expression "in one embodiment" at various places throughout the specification does not necessarily refer to the same embodiment. Moreover, the functionalities, the structures, or the particular features may be combined in any appropriate manner in one or more embodiments.

In FIG. 1 has been shown a machine that is a propeller aircraft 100. The aircraft is for example an airplane, a drone or a helicopter.

The aircraft 100 includes a powertrain, also known as the power module, that comprises a casing 190 and a propeller propulsion system, a thermal powertrain and an electric powertrain. As can be seen in FIGS. 1 to 5 and as explained hereinafter, the casing 190 houses the thermal powertrain, the rotor 202 of the electric motor 2, the stator 201 to be formed by a part of the casing 190.

The powertrain may equally be applied to nautical propulsion, and thus the machine may be a nautical craft. The propeller propulsion system comprises a propeller 3 and a propeller shaft A3 to which the propeller 3 is fixed.

By way of example, the thermal engine and/or the electric motor may drive one or more other supplementary propeller propulsion systems 3' as shown schematically in FIG. 1. This type of configuration may be termed "distributed propulsion".

The thermal powertrain comprises a thermal engine 1 that has an output shaft A1 that can be driven in rotation by the thermal engine. The thermal engine may for example turn at a speed of the order of 6000 revolutions/minute.

In accordance with one particular aspect, the powertrain comprises a torque damper AM1 for correcting/smoothing the acyclic operation of the thermal engine.

The electric powertrain comprises an electric motor 2. The electric motor 2 may turn for example at a speed of the order of 6000 revolutions/minute. The electric powertrain also includes an electric power supply system 4 that comprises a battery 40 for supplying power to the electric motor 2.

A reducer system, for example an epicyclic gear train as described hereinafter, enables the propeller to be driven at a lower speed, for example of the order of 2000 revolutions/minute.

The electric power supply system 4 also includes an electric management system 41, 42 that comprises a high-tension unit 41 for opening or closing the power supply circuit between the battery 40 and the electric motor 2. The electric power supply system 4 also includes a controller 42 for treating the current supplied by the battery 40 or produced by the electric motor 2 when it functions as a generator.

By way of example, the controller 42 is also able to transform the direct current from the battery 40 into alternating current, for example by chopping it to supply power to the electric motor 2, and conversely to transform the alternating current produced by the electric motor 2 into direct current for charging the battery 40 when the electric motor 2 is functioning as a generator, in particular when, as explained hereinafter, the rotor of the electric motor 2 is driven by the thermal engine 1 or the propeller 3.

The powertrain also comprises a clutch system configured to be able to assume a plurality of configurations as described in detail hereinafter.

As explained hereinafter, the arrangement of the electric powertrain, the thermal powertrain and the propeller propulsion system, in combination with the clutch system, selectively:

drives the propeller propulsion system 3 for the propulsion of the aircraft by means of the thermal engine 1 alone;

drives the propeller propulsion system 3 in the sense of propulsion of the aircraft by means of the thermal engine 1 alone and driving the electric motor 2 to charge the battery and possibly one or more other batteries by means of the thermal engine 1;

drives the propeller propulsion system 3 for the propulsion of the aircraft by means of the electric powertrain 2 only;

drives the propeller propulsion system 3 by means of the rotation movement of the output shaft of the thermal engine 1 transmitted to the propeller shaft and the rotation movement of the electric motor 2 also transmitted to the propeller shaft (or propeller 3). In other words, in this case the rotation of the propeller results from the transmission to the propeller shaft A3 (or propeller 3) of the combined rotation movement of the thermal engine and the electric motor.

In accordance with one particular embodiment, the clutch system of the powertrain has a configuration for driving the electric motor 2 to charge the battery 40 when the propeller 3 is driven by wind (or water).

The clutch system may comprise friction type or dog clutches.

The powertrain comprises an intermediate shaft A2. As can be seen in the figures, the intermediate shaft A2 is disposed between the output shaft 1 and the propeller shaft A3. Moreover, the intermediate shaft A2 is housed in the rotor 202.

Clutch System in Accordance with the Embodiment from FIGS. 1 to 5

In the embodiment from FIGS. 1 to 5, the shaft A2 can be rigidly connected (coupled) in rotation to the propeller shaft A3 via the clutch E23. In the alternative embodiment shown in FIG. 6 and described hereinafter the shaft A2 corresponds to a portion of said propeller shaft A3.

The clutch system comprises a clutch E123 which, in the engaged state, transmits the rotation of the thermal engine 1 to the intermediate shaft A2. In the disengaged state of the clutch E123, the rotation of the thermal powertrain 1 is no longer transmitted to the intermediate shaft A2. The clutch E123 is situated between the output shaft A1 of the thermal engine and the intermediate shaft A2.

The clutch system also comprises a clutch E324 which, in the engaged state, transmits the rotation of the electric motor 2, in particular from the rotor 202, to the propeller 3. In the disengaged state of the clutch E324 the rotor 202 is no longer coupled in rotation to the propeller 3 or to the propeller shaft A3 (in particular when the clutch E14 and/or E23 is/are disengaged).

The clutch system comprises the clutch E23 which, in the engaged state, enables transmission of the rotation of the intermediate shaft A2 to the propeller shaft A3, preferably with a reducer system.

The clutch E23 enables transmission to the propeller shaft A3 of the rotation of the intermediate shaft A2 that stems from the rotation of the output shaft A1, in the engaged state of the clutch E123, and/or of the rotation of the rotor 202, in the engaged state of the clutch E14.

Disengaging the clutches enables interruption of transmission of the corresponding movement.

In the example illustrated in FIGS. 1 to 5 the clutch system comprises a clutch E14 a first part of which is, in the engaged state of the first clutch E123, constrained to rotate with the output shaft A1 of the thermal engine 1. Said first part of the clutch E14 is mounted so as to be constrained to rotate with a part of the intermediate shaft A2. A second part of the clutch E14 is mounted so as to be constrained to rotate with the rotor 202 of the electric motor 2.

In the example illustrated in FIGS. 1 to 5, the clutch E324 has a part that is coupled (in rotation) to the rotor 202 of the electric motor 2 via a mechanical transmission system of gears S3, S223, C213, the other part of which is constrained to rotate with the propeller 3 (or propeller shaft). In particular, said other part is mounted to be constrained with the base of the spinner of the propeller 3, also termed the propeller plate. The clutch E324 therefore enables transmission of the rotation of the rotor 202 of the electric motor 2 to the propeller 3 (or again to the propeller shaft A3 that is rigidly connected to the propeller).

In the engaged position, the clutch E324 enables the electric motor 2 to be driven by the propeller 3 when the latter is driven by the external flow to which it is subjected (wind driven or water driven effect).

The mechanical transmission system S3, S223, C213 is a geared transmission system. The transmission system is preferably of epicyclic gear train type. The epicyclic gear train comprises an interior shaft S3, termed the sun gear, corresponding to a part of the rotor 202 of the electric motor 2, and a ring gear C213 carried by the interior of the hollow body of the stator 201 (described hereinafter) and a planet gear S223 disposed between the sun gear S3 and the ring gear C213. The planet gear S223 is rigidly connected to a planet carrier that is coaxial with the propeller shaft A3. The end of the planet carrier opposite the planet gear S223 is mounted so as to be constrained to rotate with a part of the clutch E324.

The clutch E23 comprises a part coupled (in rotation) to the intermediate shaft A2 by the geared mechanical transmission system S2, S23, C223 and another part constrained to rotate with the propeller shaft A3.

Figure 1A:
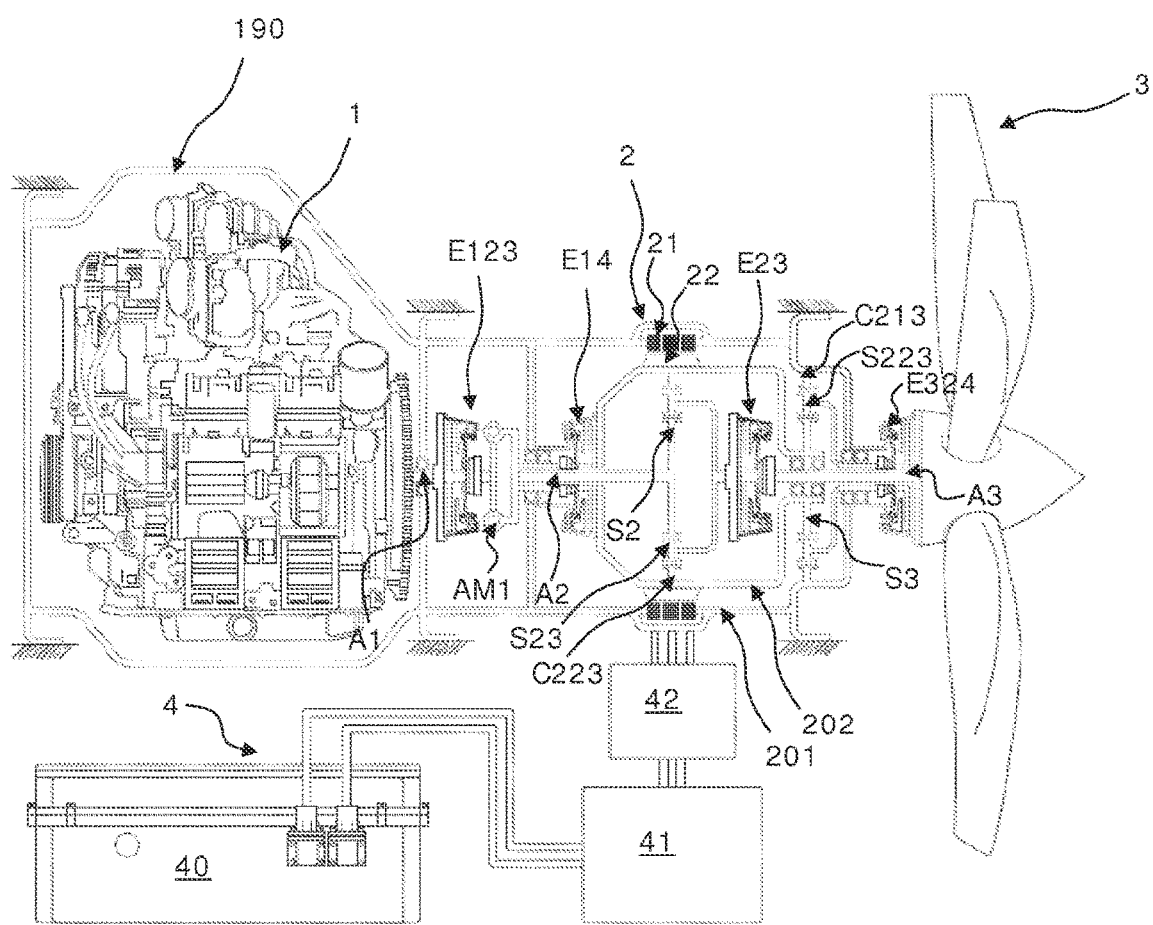
FIG. 1A is a schematic view of a powertrain of an aircraft conforming to one embodiment of the invention.

In the example illustrated in FIGS. 1 to 5 the mechanical transmission system S2, S23, C223 is a geared transmission system. The transmission system is preferably of the epicyclic gear train type. The epicyclic gear train comprises an interior shaft S2, termed the sun gear, corresponding to a part of the intermediate shaft 2 and a ring gear C223 carried by the interior of the hollow body of the rotor. A planet gear S23 is disposed between the sun gear S2 and the ring gear C223. The planet gear S23 is rigidly connected to a planet carrier that is coaxial with the intermediate shaft A2 and the propeller shaft A3. The end of the planet carrier opposite the planet gear S23 is constrained to rotate with a part of the clutch E23. The clutch E23 is also disposed in the interior of the hollow body of the rotor 202, as shown in FIG. 1A, for example.

Electric Powertrain in Accordance with the Embodiment from FIGS. 1 to 5

In the embodiment illustrated in FIGS. 1 to 5, the electric motor 2 comprises a stator 201 and a rotor 202. The stator 201 has a hollow body provided with a winding 21 on its internal face. In the example illustrated in FIGS. 1 to 5, the stator 201 is a part of the casing 190.

The rotor 202 has a body rotating about the (longitudinal) axis of the intermediate shaft A2 inside the stator 201. Depending on the configuration of the clutch system the rotor is able to turn about the intermediate shaft A2, relative to said intermediate shaft, or to turn with said intermediate shaft A2 about the (longitudinal) axis of the intermediate shaft A2. The rotor 202 is advantageously provided with magnets 22 on its external peripheral face.

Driving the intermediate shaft A2 in rotation by the output shaft A1 of the engine 1 or by the rotation of the rotor 202 of the electric motor 2 enables driving in rotation of the planet gear S23 and therefore the planet carrier coupled to the clutch E23. Closing the clutch E23 enables that rotation to be transmitted to the propeller shaft A3 to drive the propeller 3 in rotation.

Thus the rotation of the intermediate shaft A2 may be transmitted to the propeller shaft A3 and therefore to the propeller 3 by closing the clutch E23.

Moreover, closing the clutch E324 enables transmission of rotation movement between the rotor 202 of the electric motor 2 and the propeller 3.

In accordance with one particular aspect, the system of clutches E123, E14, E23, E324 is also configured to have a configuration in which the propeller 3, rotated by the wind driven or water driven effect, transmits its rotation movement to the electric motor 2 to generate an electric current for charging the battery 40.

In accordance with one particular aspect, one of the clutches E14, E324 is disengaged when the other clutch E324, E14 is engaged.

One or each of the parts of a clutch mounted to be constrained to rotate with a shaft may be mounted to slide on said shaft, for example by means of splines, to go from an engaged position to a disengaged position and vice versa.

Control Method

The powertrain described hereinafter enables use of different methods of controlling the aircraft by adapting the configuration of the clutches.

In the example illustrated in FIGS. 2A, 2B, 2C, 3A, 4A, 5A the clutches are represented disengaged for simplicity. Nevertheless, the description hereinafter specifies the real, disengaged or engaged, configuration of each of said clutches according to the control method being used. Moreover, arrows have been added (distinct from the reference number arrows) to symbolize the movement transmission system that is active and where appropriate the electric current delivered or received by the electric power supply system.

For optimum use of the aircraft during a take-off and/or climbing phase, the powertrain enables electric propulsion of the aircraft.

Figure 2:
FIG. 2 is a schematic view of an aircraft conforming to one embodiment of the invention when taking off and/or climbing.
Figure 2A:
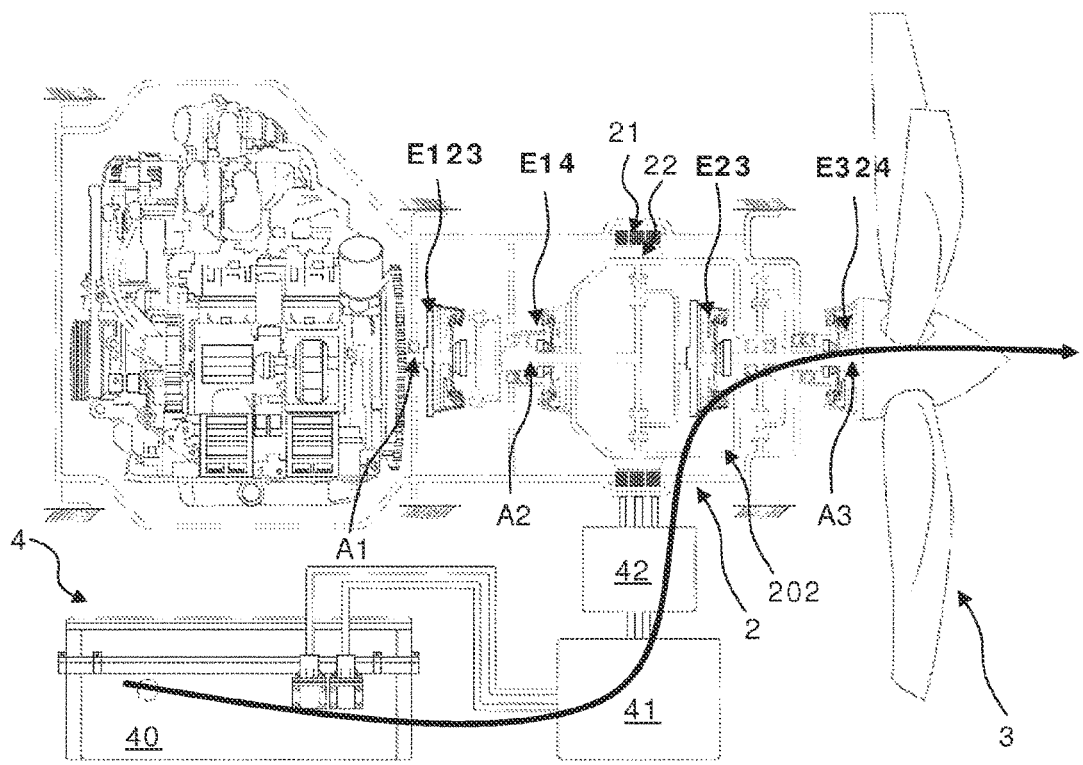
FIG. 2A is a schematic view of a powertrain of an aircraft conforming to one embodiment of the invention in electric propulsion mode.

In the example illustrated in FIGS. 2 and 2A the clutches are brought to the following configuration. The clutch E123 is disengaged to free the thermal engine 1 from the propeller 3. The clutch E14 and the clutch E23 are preferably disengaged. The clutch E324 is engaged to transmit the movement of the electric motor 2 to the propeller 3. The arrow shows that the rotation movement of the rotor 202 of the electric motor 2 supplied with electric power by the battery 40 is transmitted to the propeller 3 via the clutch E324.

Assuming a fault occurs in the electric transmission system, the powertrain enables use of thermal propulsion without use of electric propulsion.

Figure 2B:
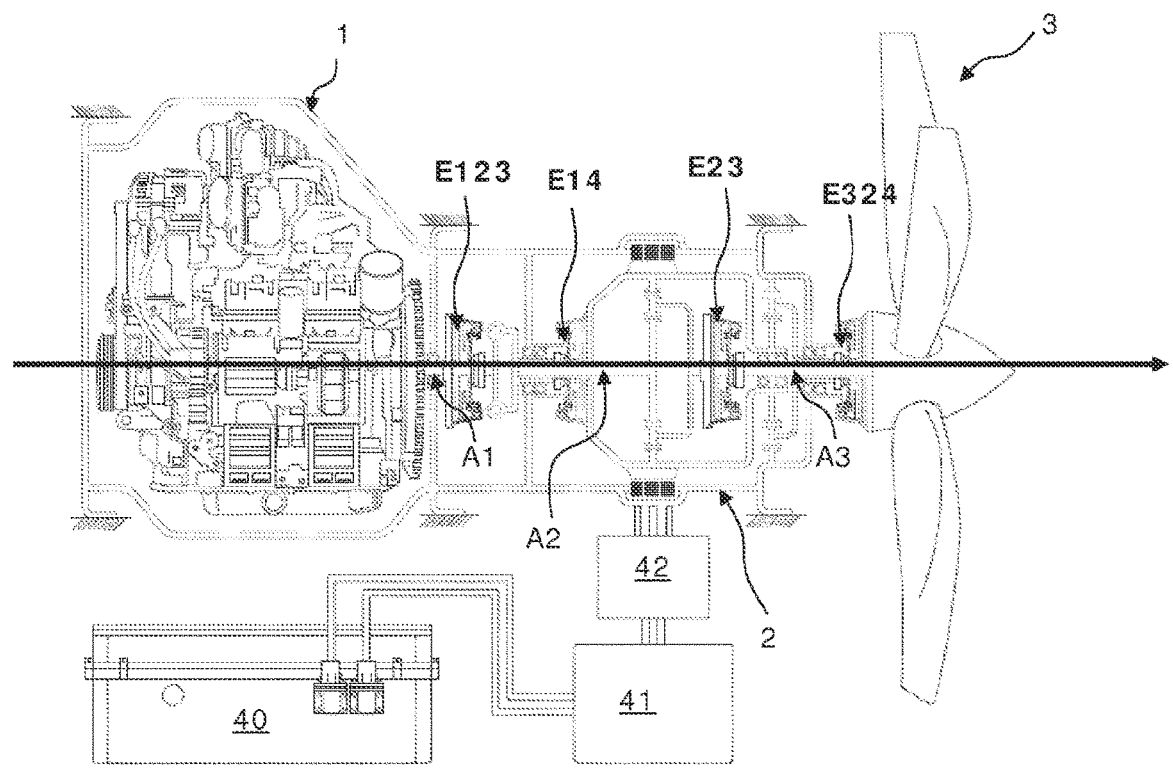
FIG. 2B is a schematic view of a powertrain of an aircraft conforming to one embodiment of the invention in thermal propulsion mode.

Thus, in the example illustrated in FIG. 2B, the clutches may be brought to a configuration in which the clutch E123 and the clutch E23 are engaged to transmit the movement of the thermal engine 1 to the propeller 3. The movement of the thermal engine 1 is transmitted to the propeller 3 via the shafts A1, A2 and A3. In accordance with a particular aspect illustrated in the embodiment from FIG. 2B, the clutch E14 and the clutch E324 are disengaged to prevent the rotor 202 of the electric motor 2 from turning. The arrow shows that the thermal engine 1 is transmitting its rotation movement to the propeller 3 via the clutches E123 and E23.

A fault may arise for example from overheating of the battery or a malfunction of a component of the electric transmission system. As a result the rotor of the electric motor no longer turns.

As explained hereinabove, in the event of a fault in the electric transmission system, as a safety measure, E324 and preferably E14 may be disengaged to reduce the risk of any additional electric problem that would result from rotation one way or the other of the rotor 202.

The fault may be detected as a function of the following criteria, which may optionally be adopted in any technically possible combination:
  reduction of electric power relative to a threshold value,
  reduction of rotation speed,
  reduction of flight path slope,
  reduction of forward speed of aircraft,
  exceptional increase of current.

If an electric fault is detected when only electric propulsion was being used, it is therefore possible to switch to thermal propulsion mode to alleviate the fault in the electric transmission system.

This kind of configuration of the clutches that enables driving of the propeller by the thermal engine alone, that is to say with no top-up from the electric motor, may also be used during a normal take-off to preserve the charge in the electric battery or if the latter is discharged.

This kind of configuration of the clutches may also be used in level flight of the aircraft if the battery is considered sufficiently charged and its charge is to be preserved.

The powertrain further enables combination of the rotation movement supplied by the thermal engine and the rotation movement supplied by the electric motor to drive the propeller.

Figure 2C:
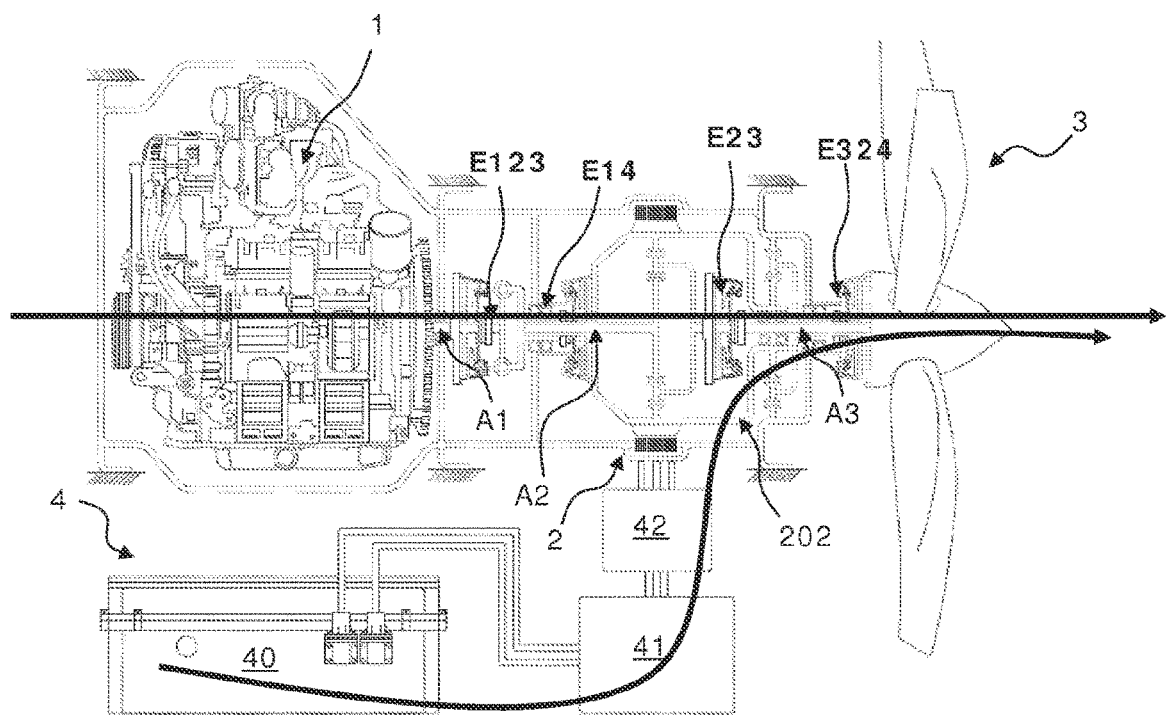
FIG. 2C is a schematic view of a powertrain of an aircraft conforming to one embodiment of the invention in thermal and electric propulsion mode.

Thus, for example if the take-off runway is short, in order to benefit from a so-called superpower mode, that is to say for propulsion through cumulative use of the thermal engine 1 and electric motor 2, the clutches may be brought to the following configuration illustrated in FIG. 2C. The clutch E123 is engaged, the clutch E14 is disengaged, the clutch E23 is engaged to transmit the movement of the thermal engine 1 to the propeller 3 and the clutch E324 is engaged to transmit the movement of the electric motor 2 to the propeller 3. The arrows show that the thermal engine transmits its rotation movement to the propeller via the clutches E123 and E23 while the rotation movement of the rotor 202 of the electric motor 2 supplied with current by the battery 40 is transmitted to the propeller via the clutch E324.

Figures 3, 3A:
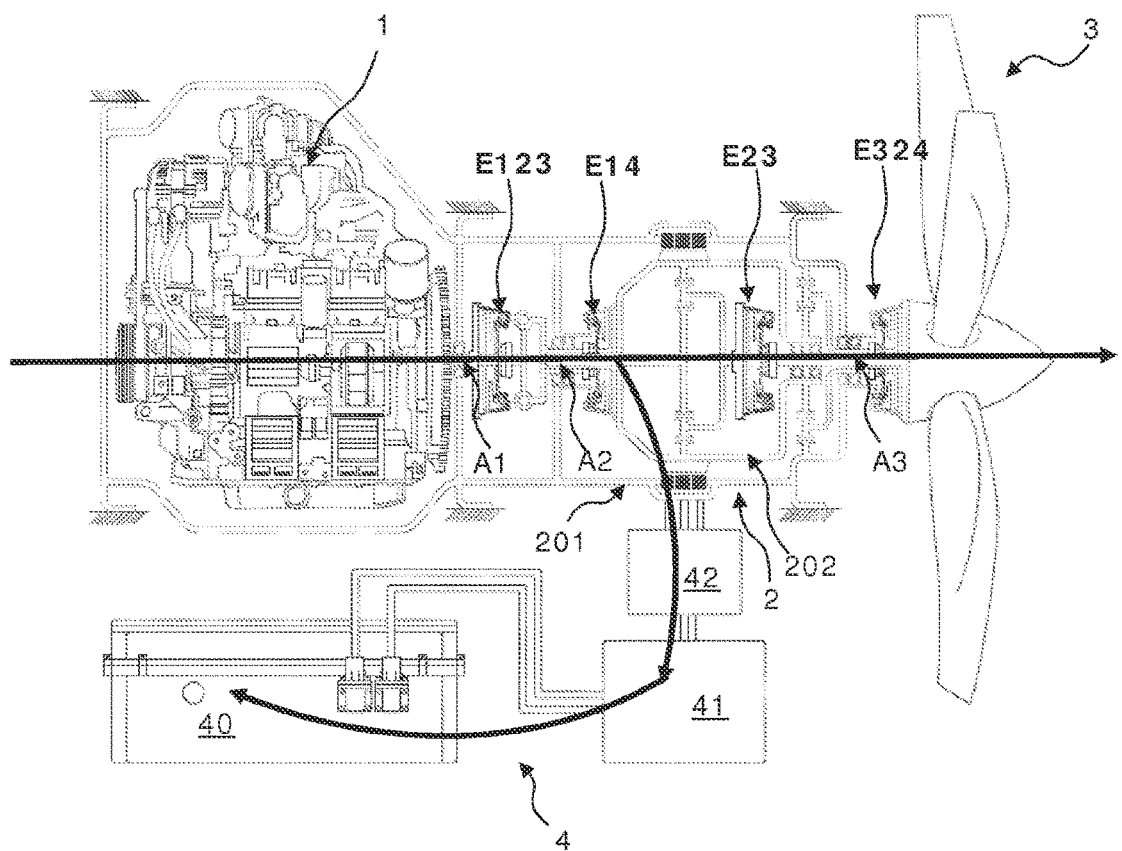
FIG. 3 is a schematic view of air aircraft conforming to one embodiment of the invention, in flight, for example in level flight.
FIG. 3A is a schematic view of a powertrain of an aircraft conforming to one embodiment of the invention in in-flight charging mode.

The powertrain also enables charging the battery 40 by means of the thermal engine 1 whilst the propeller 3 continues to be driven in rotation. Thus, for example for in-flight charging of the aircraft as illustrated in FIGS. 3 and 3A, the clutches may be brought to the following configuration. The clutch E324 is disengaged. The clutch E123, the clutch E14 and the clutch E23 are engaged. Thus, as the arrow illustrates, the thermal engine 1 drives the intermediate shaft A2, which causes the rotor 202, which is provided with magnets 22 facing the winding 21 of the stator 201 and therefore generates a current in the winding 21, to turn whilst driving the propeller A3. The electric management system 41, 42 controls the current produced by the rotation of the rotor 202 in order to charge the battery 40.

This kind of mode of operation of the powertrain enables use of surplus power from the thermal engine 1 to charge the battery 40 in flight, in particular when the battery is used for electrical propulsion in the taxiing, take-off and/or climbing phase.

Figure 4:
FIG. 4 is a schematic view of an aircraft conforming to one embodiment of the invention during descent of the aircraft.
Figure 4A:
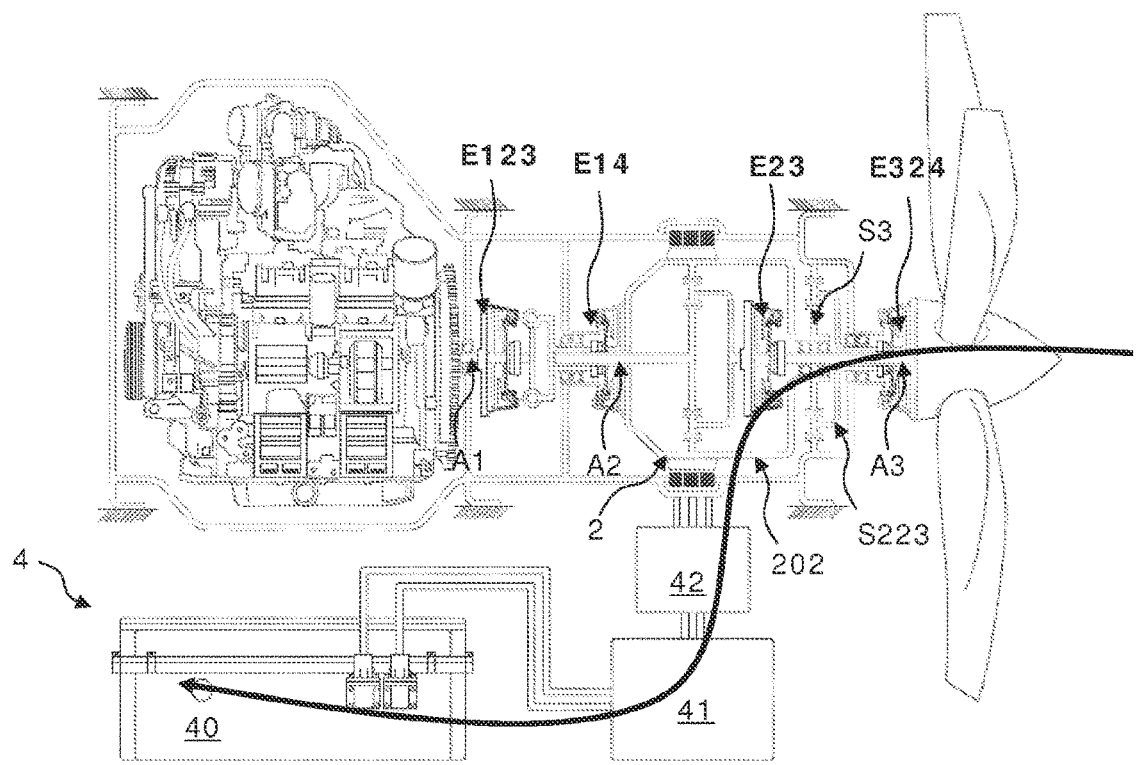
FIG. 4A is a schematic view of a powertrain of an aircraft conforming to one embodiment of the invention in electric energy recovery mode.

The powertrain enables recovery of energy by wind driven or water driven effect. Thus, in particular during descent of the aircraft leaving the propeller 3 to turn because of the effect of the flow of air in which it is situated, as illustrated in FIGS. 4 and 4A, the clutches may be brought to the following configuration. The clutch E123 and the clutch E14 are disengaged to uncouple the propeller 3 from the thermal engine 1 and to uncouple the rotor 202 from the thermal engine 1. The clutch E23 is preferably disengaged. The clutch E324 is engaged. The arrow therefore shows that the movement of the propeller 3 is transmitted to the rotor 202 of the electric motor 2 via the planet gear S223 and the sun gear S3 and that the current generated in this way is used to charge the battery 40.

Figure 5:
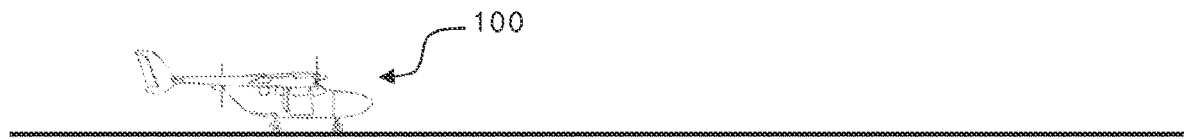
FIG. 5 is a schematic view of an aircraft conforming to one embodiment of the invention, the aircraft being on the ground.
Figure 5A:
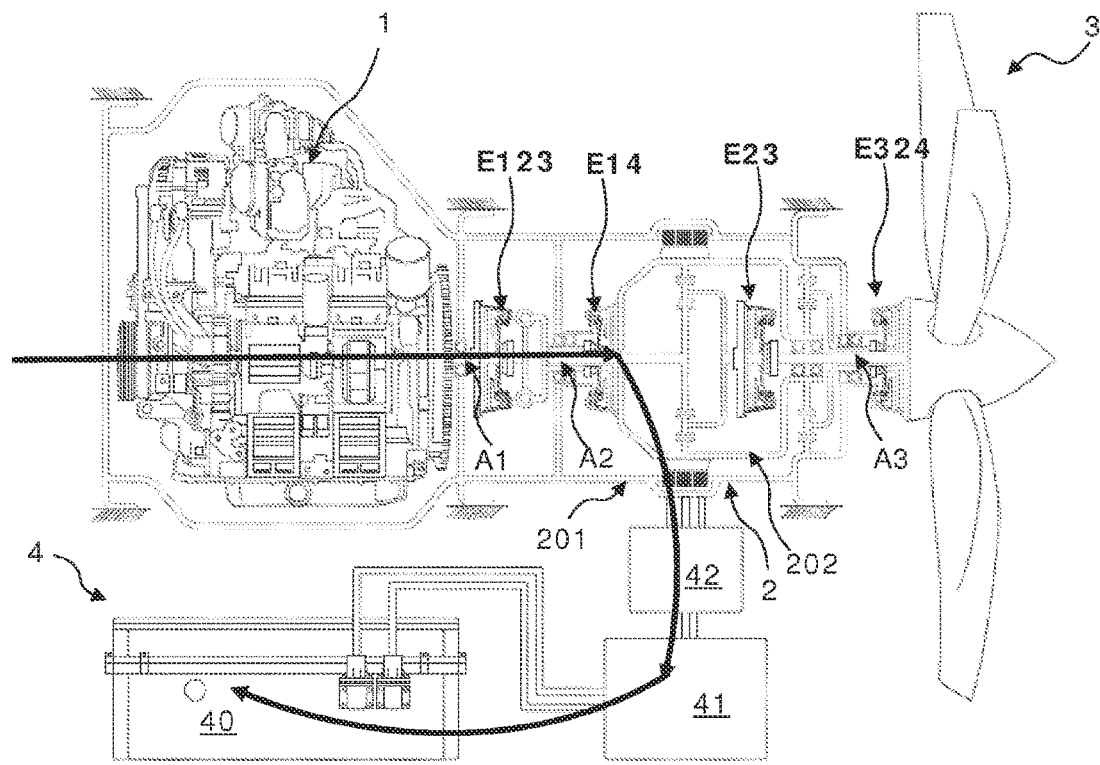
FIG. 5A is a schematic view of a powertrain of an aircraft conforming to one embodiment of the invention in charging mode via its thermal engine when the aircraft is on the ground.

The powertrain enables charging of the battery 40 by means of the thermal engine 1 without driving the propeller 3. Thus, for example for charging the aircraft on the ground and as illustrated in FIGS. 5 and 5A, the clutches may be brought to the following configuration. The clutch E324 and the clutch E23 are disengaged. The clutch E123 and the clutch E14 are engaged. As the arrow in FIG. 5A shows, the thermal engine 1 drives the intermediate shaft A2 to cause the rotor 202, which is provided with magnets 22 facing the winding 21 of the stator 201, to turn in order to generate a current that the electric management system 41, 42 controls to charge the battery 40.

In accordance with one particular embodiment, the aircraft comprises wheels provided with an electric powertrain connected to the power supply battery 40 of the aircraft via an electric management system 41, 42. In this case the powertrain enables supply of power to the electric powertrain of the wheels by the electric battery 40.

The system for managing the electric powertrain of the wheels may be that also used to manage the supply of power to the electric motor of the aircraft or a distinct management system disposed between the battery and the electric powertrain of the wheels.

The thermal engine 1 may be switched off or may idle awaiting use. In particular if the thermal engine is switched on each of the clutches E23 and E324 is disengaged in order not to drive the propeller.

Not driving the propeller improves the safety of equipment and persons around the aircraft when taxiing whilst preventing useless consumption of energy from the battery by causing the propeller to rotate.

Figure 6:
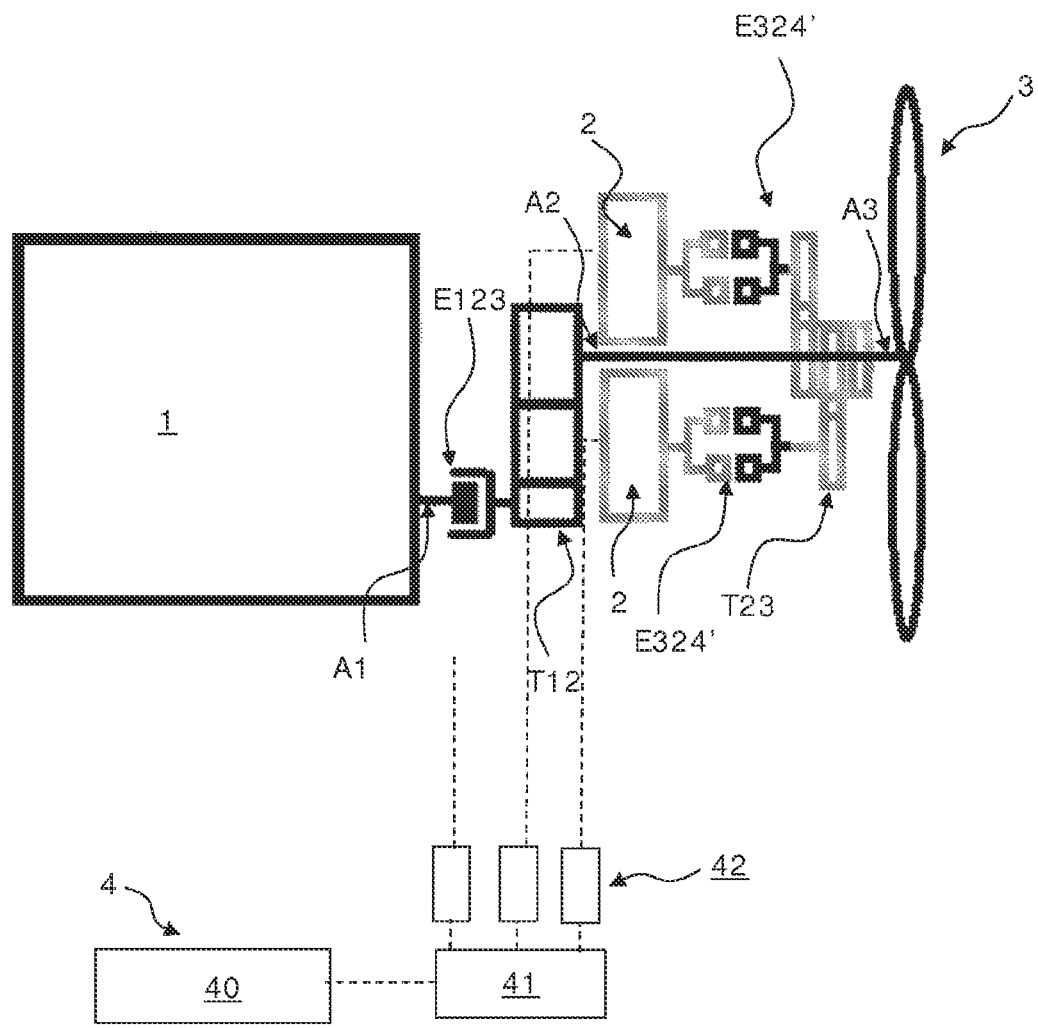
FIG. 6 is a schematic view of a variant powertrain.

Variant Embodiment Illustrated in FIG. 6

In the embodiment from FIG. 6, the powertrain comprises a clutch E123, for example a friction clutch, between said thermal engine 1 and the intermediate shaft A2.

In this example from FIG. 6 the propeller shaft A3 is rigidly connected to the intermediate shaft A2.

A part of the clutch E123 is coupled in rotation to the output shaft A1 of the thermal engine 1 and the other part of the clutch E123 is coupled in rotation to a part of the intermediate shaft A2.

The intermediate shaft A2 is in two parts offset axially from one another. The two parts of the intermediate shaft A2 are interconnected by a pulley and belt transmission device T12.

The electric powertrain may comprise one or more electric motors 2 offset axially relative to the propeller shaft A3. There could equally be provided a "radial" offset with a bevel gear system and a dog clutch or clutch system on each electric motor output shaft.

Each electric motor 2 is connected to the electric power supply system 4. In particular, a controller 42 is provided for each electric motor 2.

The output shaft of each electric motor 2 is constrained to rotate with a part of a clutch E324', preferably of dog clutch type. The other part of the clutch E324' is constrained to rotate with a transmission system T23, for example one with pulleys and belt, adapted to transmit the rotation movement of the electrical powertrain to the propeller shaft A3.

Each clutch E324' enables uncoupling of the associated electric motor 2 from the transmission system T23, in particular in the event of failure of said electric motor or of each of said electric motors.

Thus, in this embodiment illustrated in FIG. 6, each electric motor 2 is provided with an independent friction or dog type clutch system E324' that is functionally similar to the clutch E324 of the embodiment from FIGS. 1 to 5.

Only two electric motors are schematically represented in FIG. 6, but a third electric motor is nevertheless present and connected to the transmission system T23 in a similar manner to the other electric motors by a friction or dog clutch, for example of the same type as the clutch E324'. The electric powertrain preferably includes three or more electric motors.

In the example illustrated in FIGS. 1 to 5, the shafts of the powertrain are coaxial and the movement of a shaft is transmitted by means of clutches that are also coaxial. In accordance with the variant embodiment from FIG. 6, the shafts A1 and A3 are offset axially.

It is therefore clear that the propeller shaft A3 can be driven by the electric powertrain in the engaged state of the or each clutch E234' and/or by the thermal engine in the engaged state of the clutch E123.

Particular Aspects

The clutch system may be controlled to go from one configuration to another by a manual or automatic control device. In particular, a control unit, such as a computer, may control a system for actuating the clutches to command the passage from one configuration to another. The control unit may take the form of a processor and a data memory in which are stored computer instructions that can be executed by said processor or the form of a microcontroller.

In other words, the functions and steps described may be executed by means of software or hardware (e.g. programmable gate arrays). In particular, the functions and steps carried out by the control unit may be implemented by sets of instructions or software modules implemented a processor or controller or produced by dedicated electronic components of FPGA or ASIC type components. It is also possible to combine software and electronics.

If the aircraft is an airplane with wheels, it is equally possible to provide for one or more wheels to be provided with an electric motor, for example incorporated in the hub. The electric motor of each wheel can be connected to the electric management system of the aircraft. Thus for the taxiing phase the electric motor or motors of the wheels can be supplied with power by the battery 40 by means of the electric power supply system 4.

The aircraft may comprise a plurality of auxiliary propeller propulsion systems that may be controlled independently of one another.

In accordance with one particular aspect, the aircraft may comprise two auxiliary (preferably lateral) propeller engines and between the two propeller engines the propeller propulsion system of the powertrain in accordance with the invention. These auxiliary powertrains and the powertrain may be of either push or pull type.

The or each propeller may be of variable pitch and placed in a so-called feathered configuration to reduce drag if not in use.

The invention is not limited to the embodiments illustrated in the drawings.

Moreover, the term "comprising" does not exclude other elements or steps. Moreover, features or steps that have been described with reference to one of the embodiments explained hereinabove may equally be used in combination with other features or steps of other embodiments explained hereinabove.

The invention claimed is:

1. A machine for driving a propeller, the machine being equipped with a powertrain wherein the powertrain comprises:
    a thermal powertrain comprising a thermal engine and an output shaft drivable in rotation by the thermal engine;
    an electric powertrain comprising an electric motor;
    an electric power supply system comprising a battery for supplying power to the electric motor;
    a propeller propulsion system comprising a propeller and a propeller shaft to which the propeller is coupled;
    wherein the powertrain also comprises a clutch system configured, selectively:
    to drive the propeller using the thermal engine without transmission of rotation of the electric motor to the propeller;
    to drive the propeller using the electric motor without transmission of rotation of the thermal engine to the propeller;
    to drive the propeller by combined transmission of the rotation of the thermal engine to the propeller and of the rotation of the thermal engine to the propeller;
    wherein the powertrain comprises an intermediate shaft rigidly connected to or able to be coupled in rotation to the propeller shaft,
    wherein the clutch system comprises:
    a first clutch configured, in an engaged state thereof, to transmit the rotation of the thermal engine to the intermediate shaft, and a second clutch configured, in an engaged state thereof, to transmit the rotation from the intermediate shaft to the propeller shaft;
and wherein the electric motor comprises a stator and a rotor, the rotor having a hollow body and being mounted to rotate about the intermediate shaft inside the stator, the rotor and the intermediate shaft being coaxial,
the second clutch being disposed within the hollow body of the rotor.

2. The machine as claimed in claim 1, in which each of the output shaft drivable in rotation by the thermal engine and the intermediate shaft about which the rotor is mounted to rotate is coaxial with the propeller shaft.

3. The machine as claimed in claim 1, wherein the stator is provided with a winding, and the rotor is provided with magnets.

4. The machine as claimed in claim 1, wherein the powertrain also comprises an epicyclic gear train mechanical transmission system that comprises:
a sun gear corresponding to a part of the intermediate shaft and a ring gear carried by an interior of the hollow body of the rotor;
a planet gear disposed between the sun gear and the ring gear and a planet carrier an end of which opposite the planet gear is constrained to rotate with a part of the second clutch, the second clutch comprising another part constrained to rotate with the propeller shaft.

5. The machine as claimed in claim 1, wherein the clutch system comprises a fourth clutch configured, in an engaged state thereof, to transmit the rotation of the thermal engine to the electric motor to cause the electric motor to function as a generator.

6. The machine as claimed in claim 5, wherein the fourth clutch comprises a part that, in the engaged state of the first clutch, is constrained to rotate with the output shaft of the thermal engine and another part that is mounted on and constrained to rotate with the rotor of the electric motor.

7. The machine as claimed in claim 1, wherein the clutch system comprises a third clutch configured, in an engaged state thereof, to transmit the rotation of the electric motor to the propeller shaft, and the third clutch comprises a part constrained to rotate with the rotor of the electric motor via a mechanical transmission system and a part constrained to rotate with the propeller.

8. The machine as claimed in claim 1, wherein the electric power supply system also includes an electric management system that comprises:
a switching unit for opening or closing a power supply circuit between the battery and the electric motor;
a controller for managing supply of current provided by the battery or produced by the electric motor when functioning as a generator.

9. A method of controlling the machine as claimed in claim 1, wherein the method comprises bringing the clutches to the following configuration:
the first clutch is disengaged to release the thermal engine from the propeller, so as to obtain electric propulsion of the machine.

10. A method of controlling the machine as claimed in claim 1, wherein the method comprises bringing the clutches to the following configuration:
the first clutch is engaged;
the second clutch is engaged to transmit the rotation of the thermal engine to the propeller so as to obtain thermal propulsion of the machine with no use of the electric powertrain.

11. A method of controlling the machine as claimed in claim 1, wherein the method comprises bringing the clutches to the following configuration:
the first clutch is engaged;
the second clutch is engaged to transmit the rotation of the thermal engine to the propeller so as to obtain propulsion of the machine by combined use of the thermal engine and the electric motor.

12. A method of controlling the machine as claimed in claim 5, wherein the method comprises bringing the clutches to the following configuration:
the first clutch, the fourth clutch and the second clutch are engaged, so that the thermal engine drives the intermediate shaft to cause the rotor to turn relative to the stator in order to generate a current produced by the electric motor functioning as the generator, whilst driving the propeller shaft;
an electric management system controlling so as to charge the battery using the thermal engine whilst maintaining driving in rotation of the propeller.

13. A method of controlling the machine as claimed in claim 7, wherein the method comprises bringing the clutches to the following configuration:
at least one selected from the group consisting of the first clutch and the second clutch is disengaged to uncouple the propeller from the thermal engine or to uncouple the rotor from the thermal engine;
the third clutch is engaged to transmit movement of the propeller to the rotor of the electric motor so as to obtain recovery of energy by wind-driven or water-driven effect.

14. A method of controlling the machine according to claim 7, wherein the clutch system comprises a fourth clutch configured, in an engaged state thereof, to transmit the rotation of the thermal engine to the electric motor to cause the electric motor to function as a generator, wherein the electric power supply system also includes an electric management system that comprises:
a switching unit for opening or closing a power supply circuit between the battery and the electric motor;
a controller for managing supply of current provided by the battery or produced by the electric motor when functioning as the generator, and wherein the method comprises bringing the clutches to the following configuration:
the third clutch and the second clutch are disengaged,
the first clutch and the fourth clutch are engaged so that the thermal engine drives the intermediate shaft to cause the rotor to turn in order to generate the current, the electric management system controlling the current produced by the electric motor functioning as the generator to charge the battery so as to charge the battery using the thermal engine without driving the propeller.

15. A method of controlling the machine as claimed in claim 1, wherein the machine comprises wheels provided with an electric powertrain of the wheels connected to the battery of the machine via an electric management system, and wherein the method comprises supplying power from the battery to the electric powertrain of the wheels.

16. A method of controlling the machine as claimed in claim 5, wherein the method comprises bringing the clutches to the following configuration:
the fourth clutch and the second clutch are disengaged so as to obtain electric propulsion of the machine.

17. A method of controlling the machine as claimed in claim 7, wherein the method comprises bringing the clutches to the following configuration:
   the third clutch is engaged to transmit the rotation of the electric motor to the propeller so as to obtain electric propulsion of the machine.

18. A method of controlling the machine as claimed in claim 7, wherein the method comprises bringing the clutches to the following configuration:
   the first clutch is engaged;
   the third clutch is engaged to transmit the rotation of the electric motor to the propeller so as to obtain propulsion by combined use of the thermal engine and the electric motor.

19. A method of controlling the machine as claimed in claim 5, wherein the method comprises bringing the clutches to the following configuration:
   the first clutch is engaged;
   the fourth clutch is disengaged so as to obtain propulsion by combined use of the thermal engine and the electric motor.

20. The method as claimed in claim 13, wherein the second clutch is disengaged.

* * * * *